United States Patent
Anderson, III et al.

(10) Patent No.: US 8,429,804 B2
(45) Date of Patent: *Apr. 30, 2013

(54) SHAFT CONNECTION ASSEMBLY

(75) Inventors: James H. Anderson, III, York, PA (US);
Adam Lehigh, Spring Grove, PA (US);
Timothy Fenton, York, PA (US)

(73) Assignee: Coupling Corporation of America, Inc., Jacobus, PA (US)

( * ) Notice: Subject to any disclaimer, the term of this patent is extended or adjusted under 35 U.S.C. 154(b) by 207 days.

This patent is subject to a terminal disclaimer.

(21) Appl. No.: 12/958,742

(22) Filed: Dec. 2, 2010

(65) Prior Publication Data

US 2012/0141199 A1 Jun. 7, 2012

(51) Int. Cl.
*B21D 39/00* (2006.01)
*F16B 2/00* (2006.01)

(52) U.S. Cl.
USPC ............................................. 29/456; 403/370

(58) Field of Classification Search .................... 29/428, 29/456, 469, 525.01, 525.11, 525.13, 508, 29/510; 403/192, 193, 195, 199, 365–371, 403/373, 374.1, 374.2, 374.4
See application file for complete search history.

(56) References Cited

U.S. PATENT DOCUMENTS

| | | | |
|---|---|---|---|
| 369,136 A | 8/1887 | Stuart | |
| 4,411,551 A | 10/1983 | Adelbratt | |
| 4,460,289 A | 7/1984 | Lundgren | |
| 4,461,592 A | 7/1984 | Adelbratt | |
| 4,464,140 A | 8/1984 | Lundgren | |
| 4,525,916 A | 7/1985 | Wuhrer | |
| 4,781,486 A | 11/1988 | Mochizuki | |
| 5,123,772 A | 6/1992 | Anderson | |
| 5,421,623 A | 6/1995 | Cassin | |
| 6,036,451 A | 3/2000 | Badger et al. | |
| 6,234,910 B1 | 5/2001 | Norberg | |
| 2012/0141201 A1* | 6/2012 | Anderson, III | ............ 403/374.4 |

OTHER PUBLICATIONS

Coupling Corporation of America, Vertical Clamp Coupling, Brochure, Feb. 2007, Coupling Corporation of America, Jacobus, Pennsylvania.
Coupling Corporation of America, Anderson Clamp Hub, Brochure, 2005, Coupling Corporation of America, Jacobus, Pennsylvania.

* cited by examiner

*Primary Examiner* — John C Hong
(74) *Attorney, Agent, or Firm* — McNees Wallace & Nurick LLC

(57) ABSTRACT

A shaft connection assembly for the transfer of torque between two shafts is disclosed. The assembly includes a hub and an elongated annular collar. The hub includes a flange portion and a sleeve portion, the sleeve portion having a plurality of sleeve segments formed by longitudinal cuts along the length of the sleeve portion such that when the collar is forced linearly, axially away from the flange portion, the sleeve segments exert a clamping force on each of two shafts disposed within a passageway formed by the hub. The clamping force prevents relative movement of the first shaft with respect to the second when the shafts are rotated about a common axis. A method for joining two shafts for the transfer of torque using the shaft connection assembly is also disclosed.

16 Claims, 4 Drawing Sheets

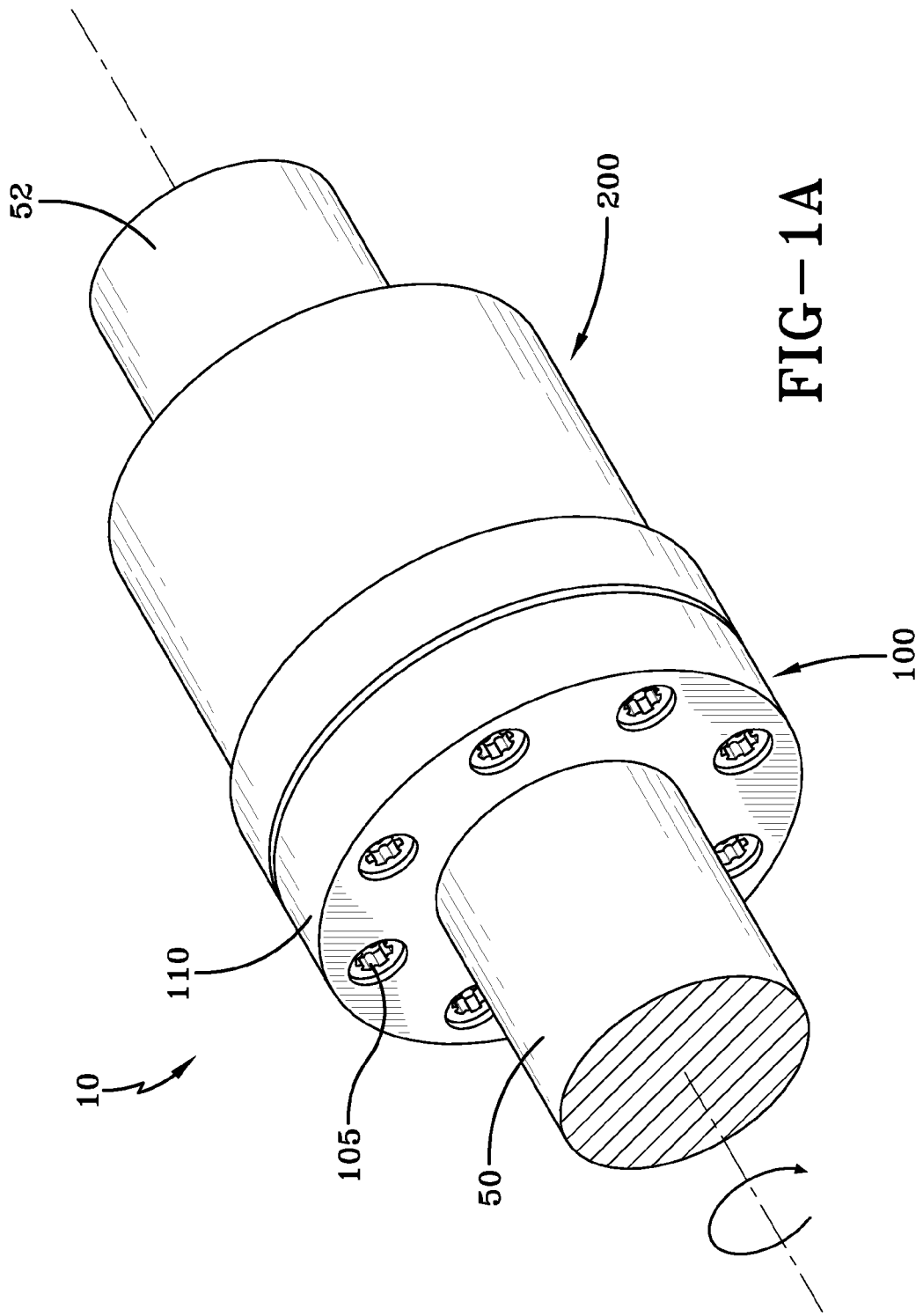

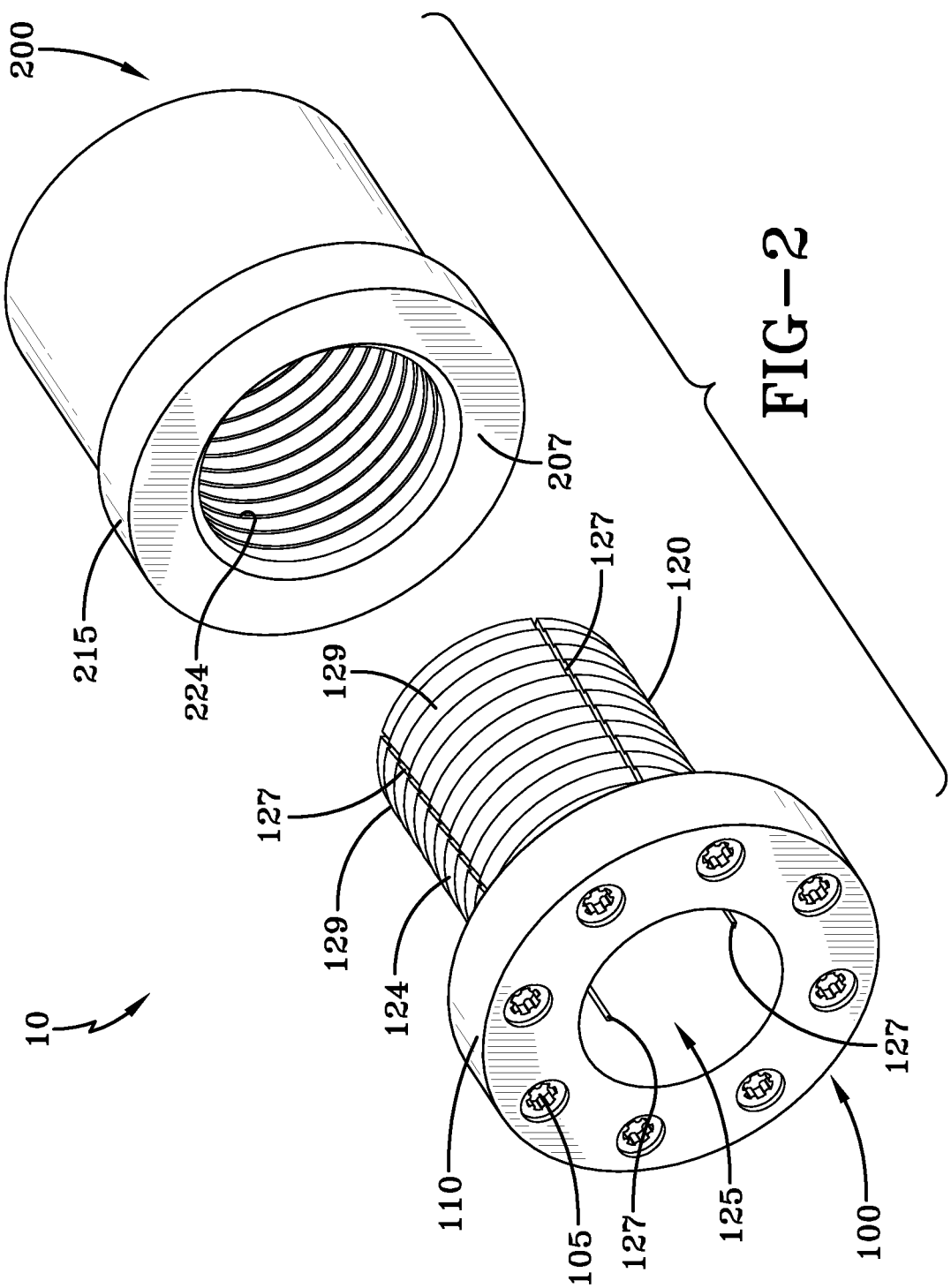

SHAFT CONNECTION ASSEMBLY

FIELD OF THE INVENTION

The present invention is directed to a coupling and more particularly to an assembly for connecting two shafts for the transfer of torque.

BACKGROUND OF THE INVENTION

It is common for a motor be used to drive a shaft, which transfers torque from the motor to be used as mechanical energy for driving a pump, ship propeller or any number of other applications. In some cases, the torque must be carried over long distances that exceed the length of a single shaft attached to the motor and one or more additional shafts are required to connect the motor to the ultimate device to which the mechanical energy is being transferred. In cases where torque is to be transmitted from one shaft to another, any of several coupling types have heretofore been used; however, each presents problems.

Among the simplest solutions is the use of two threaded shafts joined by a threaded coupling. While effective in situations in which the shafts turn only in one direction, this solution does not adequately work in environments where the shafts are intended, or can, rotate in an opposite direction. In fact, this common solution can have significant adverse consequences by causing the two shafts to fly apart from one another if, for example, the polarity of a motor driving the shafts is inadvertently switched during a repair operation, particularly when the shafts are positioned vertically for use in a down-well application. Furthermore, the need for threaded shafts having precise machining results in increased material costs.

Another common solution is through the use of a fastener or other device attached to a first shaft that engages and draws together a corresponding socket or other device attached to the second shaft. However, a significant drawback in these type of devices is that they require relative movement of the two shafts with respect to one another as they are being drawn toward each other as part of the coupling process. Thus, this type of coupling cannot be used in precision applications where one or both of the shafts to be connected are already in place or otherwise cannot be moved.

Another current solution is the use of two clamps which are fastened together, either directly, or through the use of a spacer to which each of the clamps are coupled. This results in increased material cost by requiring the presence of at least two clamps, plus that of any spacer. It also results in increased difficulty during maintenance operations as the clamps must first be decoupled from one another before the shafts can be removed from the clamp. Further, the need to fasten the two clamps together can also result in an increased diameter of the coupling to accommodate the fasteners. This can reduce the types of applications in which the coupling can be used, particularly in down-well applications where space is at a premium and may be limited by the diameter of the well casing in which it is employed.

Still another type of solution is the use of hydraulic clamps. While hydraulic clamps are useful in some situations, the principles of their operation require the presence of a hydraulic fluid that creates additional complexities in the operation and, importantly, the maintenance of such clamps.

These and other drawbacks are found in known devices for coupling two shafts for the transfer of torque.

What is needed is a connection assembly that can provide a single device to connect two shafts that can be easily assembled and maintained, while providing for the transfer of torque regardless of the direction of rotation.

SUMMARY OF THE INVENTION

According to an exemplary embodiment of the invention, a method of joining a first shaft to a second shaft for the transfer of torque is disclosed. The method comprises providing a hub having a flange portion and an elongated annular sleeve portion together defining a common passageway through the hub in which the sleeve portion has a plurality of substantially longitudinal slits therein extending from a distal end toward the flange portion to form a plurality of sleeve segments, the sleeve portion further having an outer surface comprising a first set of surface features. The method further includes providing an elongated annular collar having an inner surface having a second set of surface features configured to engage the first set of surface features of the sleeve portion of the hub, attaching the collar to the sleeve portion of the hub, inserting a first shaft into a first end of the passageway, inserting a second shaft into an opposing end of the passageway, and urging the collar axially away from the flange portion to an operative position along the sleeve portion. The axial movement urges the sleeve segments radially inward to exert a clamping force, thereby clamping the first shaft to the second shaft by sleeve segments common to the first and second shafts. The clamping force exerted by the sleeve segments is sufficient to prevent relative movement of the first shaft with respect to the second shaft when the first and second shafts are rotated about a common axis.

According to another exemplary embodiment of the invention, a shaft connection assembly comprises a hub and an elongated annular collar. The hub includes a flange portion, and an elongated annular sleeve portion, the sleeve portion having a plurality of substantially longitudinal slits therein extending from a distal end of the sleeve portion toward the flange portion to form a plurality of sleeve segments, the sleeve having an outer surface comprising a first set of surface features, wherein the flange portion and the sleeve portion define a common passageway having a travel stop located therein. The elongated annular collar has an inner surface having a second set of surface features configured to engage the first set of surface features of the sleeve portion of the hub. The sleeve portion and the collar are dimensioned such that when a first and second shaft are inserted into opposite ends of the sleeve portion, the sleeve segments are common to each of the first and second shafts, and the collar is urged axially away from the flange portion to an operative position along the length of the sleeve portion, the sleeve segments apply a clamping force on each of the first and second sleeve portions to prevent relative movement of the first shaft with respect to the second shaft when the shafts are rotated about a common axis.

An advantage of exemplary embodiments is that a single shaft connection assembly is provided to connect two shafts, eliminating the need for duplicative assemblies that must themselves be fastened together and also eliminating the need for duplicative parts.

Another advantage is that shaft connection assemblies in accordance with exemplary embodiments accomplish the connection mechanically, without the requirement of special tools or special fluids as found in hydraulic couplings.

Still another advantage is that shaft connection assemblies in accordance with exemplary embodiments are particularly useful in applications in which two shafts are to be oriented vertically during operation, such as line shaft and vertical pump applications.

Other features and advantages of the present invention will be apparent from the following more detailed description of exemplary embodiments, taken in conjunction with the accompanying drawings which illustrate, by way of example, the principles of the invention.

BRIEF DESCRIPTION OF THE DRAWINGS

FIGS. 1a and 1b illustrate front and rear perspective views of a shaft connection assembly in accordance with an exemplary embodiment.

FIG. 2 illustrates an exploded perspective view of the shaft connection assembly of FIG. 1.

Where like parts appear in more than one drawing, it has been attempted to use like reference numerals for clarity.

DETAILED DESCRIPTION OF EXEMPLARY EMBODIMENTS

Figure 1B:
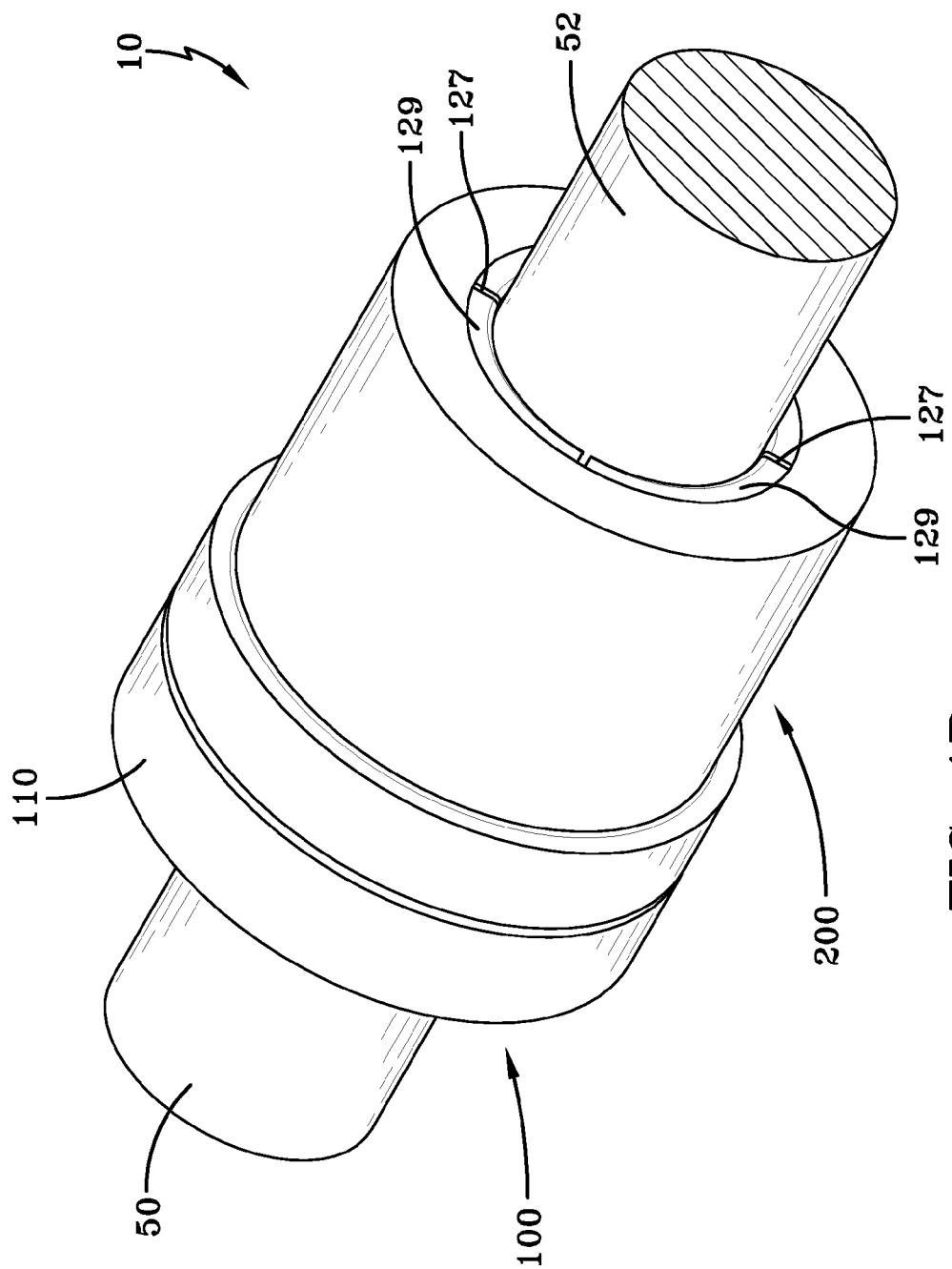

Turning to FIGS. 1a and 1b, a shaft connection assembly 10 is illustrated in accordance with an exemplary embodiment having a hub 100 and an elongated annular collar 200. The design of the shaft connection assembly 10 permits it to be used to connect two shafts 50, 52 for the transfer of torque without requiring that the shafts be threaded and while preventing relative movement between the two shafts that could result in torsional strain that could lead to part failure of the shafts or the items to which they are attached. The shafts 50, 52 are preferably of the same diameter or profile and of the same cross-sectional area. For clarity in illustration, the shafts are omitted from the remaining figures.

As better seen in FIG. 2, which illustrates an exploded, unassembled view, the hub 100 includes a flange portion 110 and an elongated annular sleeve portion 120 that extends away from the flange portion 110. The flange and sleeve portions 110, 120 together define a common passageway 125 through the hub 100 in which the shafts are inserted and secured within the shaft connection assembly 10.

Shaft connection assemblies in accordance with exemplary embodiments may be used in applications in which they are subjected to demanding conditions. The shaft connection assembly 10 may be constructed of a robust material, such as a 4000 series alloy steel. In some embodiments, such as where the shaft connection assembly 10 will be operated in corrosive environments, it may be desirable for the assembly to be constructed of or plated with stainless steel, platinum or other corrosion resistant material. It will be appreciated, however, that the shaft connection assembly 10 can be manufactured of any suitable material and that in addition to the environment of operation, the material selected may also depend on the material of construction of the shafts being connected, as well as the torque to be transferred and under which the assembly 10 will operate.

In addition to the possibility of exposure to high temperatures, shaft connection assemblies in accordance with exemplary embodiments may be attached to shafts turning at many thousands of rotations per minute and transferring torque as high as 50 million foot pounds or more. Thus, the flange and sleeve portions 110, 120 are typically cylindrical and concentric to achieve balance when the assembly 10 is in operation and turning about its axis.

The interior surface of the hub 100 that defines the passageway 125 is preferably unthreaded to be able to receive smooth shafts. As a result, expensive machining associated with obtaining or creating threaded shafts can be avoided, although surface features, coatings and other friction enhancements may be provided in the surface defining the passageway 125. It will be appreciated, however, that threaded shafts and/or a threaded passageway are not precluded and will still be secured by the shaft connection assembly 10. Exemplary embodiments include keyless constructions that do not require the use of a keyed shaft or a keyed hub. As a result, neither the shafts nor the hub are required to have any particular relative orientation to one another during assembly.

The elongated annular sleeve portion 120 of the hub 100 has a plurality of substantially longitudinal slits 127 extending from the distal end of the sleeve portion 120 toward the proximal end of the sleeve portion adjacent the flange portion 110. The longitudinal slits 127 may be linear, or non-linear, such as helical. The arrangement of slits 127 results in the formation of a plurality of sleeve segments 129 in the sleeve portion 120. The slits 127 permit inward radial movement of the sleeve segments 129 against both shafts in the passageway 125 to securely clamp the shafts together.

The sleeve portion 120 has an outer surface with undulating surface features having protrusions and indentations for engaging with a corresponding set of surface features of the collar 200. In one embodiment, the undulating features of the sleeve portion are grooves 124, such as symmetric or asymmetric grooves. In one embodiment, the grooves 124 are in the form of threads, typically in the form of buttress threads. It will be appreciated however, that the grooves 124 need not be threads and could instead be annular rings, provided that the surface features can still be engaged by corresponding surface features in the elongated collar 200.

The elongated collar 200 has undulating surface features, such as grooves 224, on an inner surface that correspond to those surface features of the outer surface of the sleeve portion 120 of the hub 100. Where the grooves 124, 224 are threaded, the collar 200 can be screwed onto, and thereby engage, the sleeve portion 120. The outer surface of the collar 200 is typically smooth and may optionally include a jacking lip 215, which may be useful in the removal or other maintenance of the shafts or the machines to which the shafts are attached.

The shafts may be inserted into the passageway 125 either before or after the collar 200 is engaged with the sleeve portion 120. After the shafts have been inserted within the passageway 125 and the collar 200 has been positioned over the sleeve portion 120 of the hub 100, the assembly 10 can be moved to its operative position to secure the shafts within the passageway 125. This operative position occurs by urging the collar 200 to move axially away from the flange portion 110 and along the sleeve portion 120 in a linear manner. That is, in embodiments in which the collar 200 is threaded onto the sleeve portion 120, the collar 200 is urged to move in the opposite direction from which it had been threaded, but in an axial rather than a rotational manner. This axial movement urges the sleeve segments 129 radially inward toward each other, resulting in a reduction in cross-sectional area defined by the inner surfaces of the sleeve segments 129 forming passageway 125 and thereby exerting a clamping force on the shafts positioned in the passageway 125.

The corresponding engaged surface features 124, 224 of the outer surface of the sleeve segments 129 and the inner surface of the collar 200 permit a limited amount of axial travel in which the engaged surfaces provide opposing inclined planes. The pitch of the surface features 124, 224 is such that the amount of axial travel is sufficient to achieve a sufficient corresponding inward radial movement of the sleeve segments 129 to exert the necessary clamping force, but without the engaged surface features slipping past one another to an adjacent mating feature that could prevent effective clamping.

As illustrated, one manner in which the collar 200 may be forced axially away from the flange portion 110 to its operative position and cause the sleeve segments 129 to exert a clamping force on the shafts is through a plurality of set screws 105 or other threaded members distributed about the circumference of the flange portion 110. As the screws 105 are tightened, they emerge from the back side of the flange portion 110 (best seen in FIG. 4) and contact a facing surface 207 of the collar 200, urging the collar 200 axially away from the flange portion 110. It may further be desirable to load the set screws 105 to a predetermined torque using a torque wrench or the like, to further ensure a radially uniform clamping force is exerted by the sleeve segments 129 on the shafts.

Although shown and described with respect to set screws or other threaded members, it will be appreciated that any method of exerting a force may be employed that results in an axial movement of the collar 200 with respect to the sleeve segments 129 and thereby causes the surface features to engage and reduce the effective diameter of the passageway 125.

The shafts are retained within the passageway by common sleeve segments 129. That is, the same sleeve segments 129 retain both the first and second shafts. As a result, the clamping forces exerted at different points along the length of the sleeve portion 120 may not necessarily be axially uniform, as the amount of radially inward movement is greatest at the distal end of the sleeve segments 129. However, depending upon the thickness profile along the sleeve segment 129, as well as the mating features between the collar 200 and the sleeve portion 120, clamping forces may not vary significantly at different points along the sleeve portion 120 and in all cases is designed to be sufficiently great to prevent relative movement of the shafts with respect to one another when rotated about a common axis.

Figure 3:
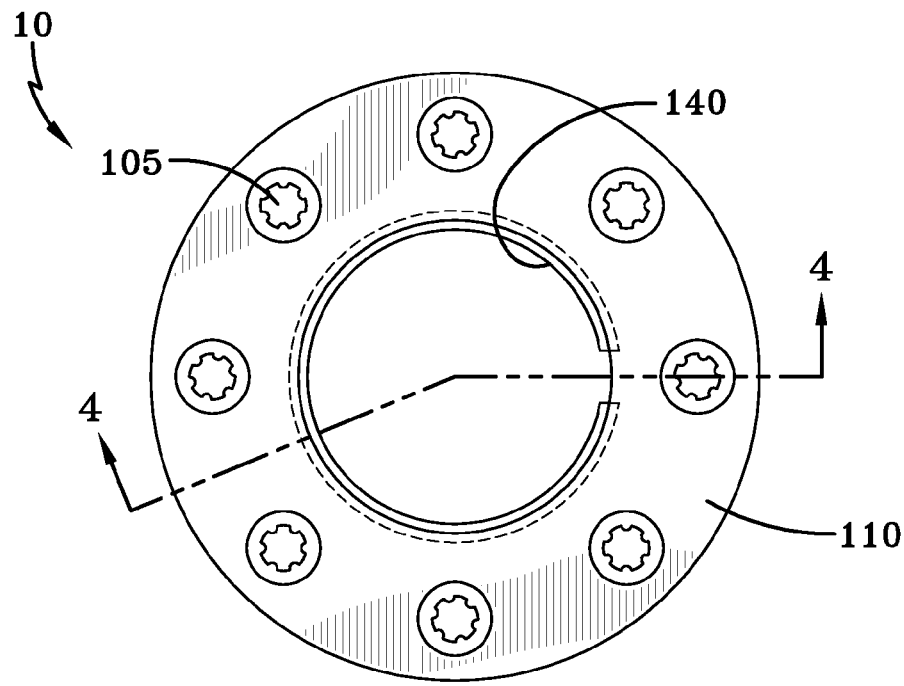
FIG. 3 illustrates a front view of the assembly of FIG. 1.
Figure 4:
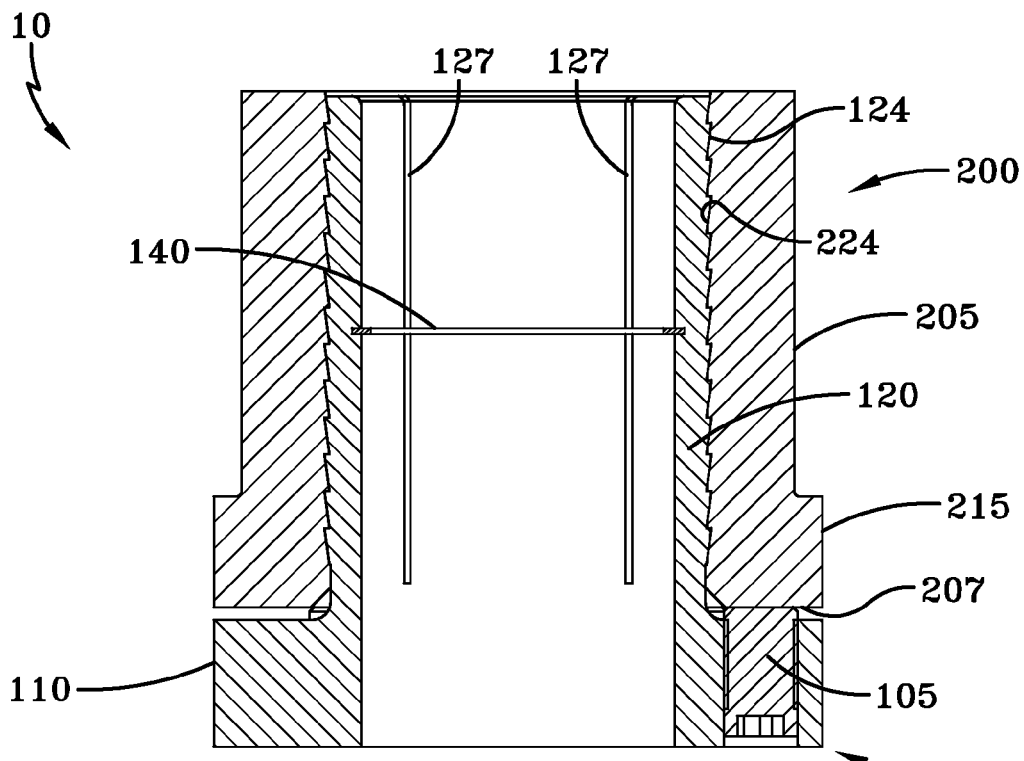
FIG. 4 illustrates a cross-sectional view taken along line 4-4 of FIG. 3.

Turning to FIGS. 3 and 4, one way in which substantially equal force may be applied to both shafts, or at least to ensure the force is sufficient to resist relative movement of the shafts, is through the use of a travel stop 140 provided within the passageway 125. The travel stop 140 defines a maximum distance of travel for the shafts when they are inserted in the passageway 125 and insures that a minimum length of each shaft is present within the passageway to achieve a sufficient clamping force. Alternatively, any other manner of identifying the proper distance of travel within the passageway 125 may also be employed, such as, for example, a scribe line applied to one or both shafts.

The travel stop 140 can be machined integral with the sleeve portion 120 at the time of its manufacture or can be a separate piece subsequently inserted into the sleeve portion. The position of the travel stop 140 is predetermined such that the clamping force exerted on each shaft is sufficient to resist relative movement of the shafts with respect to one another when they are rotated about their common axis. In one embodiment, the clamping force applied to each shaft is substantially equal. The force needed to resist relative movement may depend upon the length of the shaft connection assembly 10, the length of the slits 127 in the sleeve portion 120, the thickness and profile of the sleeve portion 120, the diameter of the passageway 125 and shafts 50, 52 to be disposed therein, and other factors.

In addition to adjusting the relative lengths of the shafts that are positioned within the passageway, it will be appreciated that the manner in which the clamping force exerted on the shafts can be equalized may be accomplished by other modifications. For example, the sleeve portion 120 may be tapered, such that the sleeve segments 129 are thicker at the distal end of the sleeve portion 120 than at the proximal end, or vice versa.

Applications in which shaft connection assemblies in accordance with exemplary embodiments are particularly useful are those in which the shafts are oriented vertically, such as in line shaft and down-well pump applications. Particularly in down-well applications, in which space may be limited by the diameter of the well casing, it may be desirable to minimize the overall diameter of the assembly 10, which can be accomplished by providing a flange portion 110 that has a diameter that is substantially the same as the collar 200.

The use of a shaft connection assembly 10 in accordance with exemplary embodiments of the invention permits a single assembly 10 to be used in which a single hub 100 and a single collar 200 can accomplish the connection of two unthreaded shafts 50, 52 for the transfer of torque, a significant improvement over the prior art. Furthermore, exemplary embodiments are not hydraulic type couplings and thus do not require the use of special tools or special fluids. As a result, exemplary embodiments are more robust and versatile for use in a wider variety of applications than hydraulic couplings.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of joining a first shaft to a second shaft for a transfer of torque comprising:

providing a hub having a flange portion and an elongated annular sleeve portion together defining a common passageway through the hub, the sleeve portion having a plurality of substantially longitudinal slits therein extending from a distal end toward the flange portion to form a plurality of sleeve segments, the sleeve portion further having an outer surface comprising a first set of surface features;

providing an elongated annular collar having an inner surface having a second set of surface features configured to engage the first set of surface features of the sleeve portion of the hub;

attaching the collar to the sleeve portion of the hub;

inserting a first shaft into a first end of the passageway;

inserting a second shaft into an opposing end of the passageway; and urging the collar axially away from the flange portion to an operative position along the sleeve portion whereby the axial movement urges the sleeve segments radially inward to exert a clamping force, thereby clamping the first shaft to the second shaft by sleeve segments common to the first and second shafts, wherein the clamping force exerted by the sleeve segments is sufficient to prevent relative movement of the first shaft with respect to the second shaft when the first and second shafts are rotated about a common axis.

2. The method of claim 1, wherein the sleeve portion and the collar are each provided having corresponding asymmetrical threaded grooves as the first and second set of surface features.

3. The method of claim 2, wherein the sleeve portion and the collar are provided having buttress threads.

4. The method of claim 1, wherein the flange portion is provided having a diameter substantially equal to an outer surface of the collar.

5. The method of claim 1, wherein each of the first and second shafts are oriented vertically.

6. The method of claim 1, wherein the sleeve portion is provided having a travel stop disposed at a predetermined position within the passageway to establish a maximum distance of travel for the first shaft when inserted therein.

7. The method of claim 1, wherein each of the first and second shafts are provided having a smooth outer surface.

8. The method of claim 1, wherein the hub is provided having the flange portion concentric with the sleeve portion.

9. The method of claim 1, wherein the collar is provided having a jacking lip on its outer surface.

10. The method of claim 1, wherein the first and second shafts each have a substantially same diameter.

11. The method of claim 1, wherein the hub is provided having a plurality of threaded members in the flange portion for urging the collar axially away from the flange portion.

12. The method of claim 1, wherein the provided hub is keyless.

13. A method of joining a first vertical shaft to a second vertical shaft for a transfer of torque comprising:

providing a hub having a flange portion and an elongated annular sleeve portion together defining a common passageway through the hub, the sleeve portion having a plurality of substantially longitudinal slits therein extending from a distal end toward the flange portion to form a plurality of sleeve segments, the sleeve portion also having an outer surface comprising buttress threads and further having a travel stop disposed at a predetermined location therein;

providing an elongated annular collar having an inner surface having buttress threads configured to threadably engage the buttress threads of the outer surface of the sleeve portion of the hub;

threading the collar onto the hub such that a facing surface of the collar is adjacent the flange portion;

inserting a first shaft having a smooth outer surface through a first end of the sleeve portion to the travel stop;

inserting a second shaft having a smooth outer surface through an opposing second end of the sleeve portion to the travel stop; and urging the collar axially away from the flange portion to an operative position along the sleeve portion whereby the axial movement urges the sleeve segments radially inward to exert a clamping force, thereby clamping the first shaft to the second shaft by sleeve segments common to the first and second shafts, wherein the clamping force is sufficient to prevent relative movement of the first shaft with respect to the second shaft when the first and second shafts are rotated about a common axis.

14. The method of claim 13, wherein the first shaft is connected to a pump.

15. The method of claim 13, wherein the hub is provided with a plurality of threaded members for urging the collar axially away from the flange portion.

16. The method of claim 13, wherein the provided hub is keyless.

\* \* \* \* \*